US009838926B2

United States Patent
Bulakci et al.

(10) Patent No.: US 9,838,926 B2
(45) Date of Patent: Dec. 5, 2017

(54) SIGNALING A NEW INFORMATION ELEMENT FOR THE MOBILITY STATE ESTIMATE OF MOVING RELAY USER EQUIPMENTS

(75) Inventors: Omer Bulakci, Munich (DE); Ahmad Awada, Munich (DE); Ingo Viering, Munich (DE); Simone Redana, Munich (DE); Richard Waldhauser, Munich (DE)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/413,171

(22) PCT Filed: Jul. 24, 2012

(86) PCT No.: PCT/EP2012/064471
§ 371 (c)(1),
(2), (4) Date: Jan. 6, 2015

(87) PCT Pub. No.: WO2014/015895
PCT Pub. Date: Jan. 30, 2014

(65) Prior Publication Data
US 2015/0181480 A1  Jun. 25, 2015

(51) Int. Cl.
*H04W 36/00* (2009.01)
*H04B 7/15* (2006.01)
*H04W 8/08* (2009.01)
*H04W 36/32* (2009.01)
*H04W 84/00* (2009.01)

(52) U.S. Cl.
CPC .......... *H04W 36/0083* (2013.01); *H04B 7/15* (2013.01); *H04W 8/08* (2013.01);
(Continued)

(58) Field of Classification Search
CPC .............. H04W 36/0083; H04W 8/08; H04W 36/0005; H04W 84/005; H04W 36/32; H04B 7/15
(Continued)

(56) References Cited

U.S. PATENT DOCUMENTS

| 8,688,123 B2 * | 4/2014 | Gao ..................... H04W 36/245 370/331 |
| 2008/0170702 A1 * | 7/2008 | Li ......................... H04W 12/02 380/283 |

(Continued)

FOREIGN PATENT DOCUMENTS

WO     2011/019973 A2     2/2011

OTHER PUBLICATIONS

International Search Report and Written Opinion for International Application No. PCT/EP2012/064471, mailed Sep. 14, 2012, 14 pages.

(Continued)

*Primary Examiner* — Dhaval Patel
(74) *Attorney, Agent, or Firm* — Brake Hughes Bellermann LLP

(57) ABSTRACT

An apparatus is provided which includes a first connection unit configured to provide connection to a user equipment, and a processor configured to detect whether a handover of the user equipment is required, and, if a handover is required, to establish mobility information regarding the mobility state of the apparatus as mobility information of the user equipment, and to send the mobility information to at least one network element involved in the handover of the user equipment.

26 Claims, 4 Drawing Sheets

(52) U.S. Cl.
CPC ........ H04W 36/0005 (2013.01); H04W 36/32 (2013.01); H04W 84/005 (2013.01)

(58) Field of Classification Search
USPC .... 455/436, 411, 418, 437, 456.1, 425, 558, 455/422.1; 370/252, 315, 329, 331
See application file for complete search history.

(56) References Cited

U.S. PATENT DOCUMENTS

| | | | | |
|---|---|---|---|---|
| 2009/0068969 A1* | 3/2009 | Lindoff | ................ | H04W 48/18 455/161.1 |
| 2013/0079017 A1* | 3/2013 | Mach | ................ | H04W 36/0083 455/441 |
| 2014/0192781 A1* | 7/2014 | Teyeb | ................ | H04W 36/34 370/331 |
| 2014/0370898 A1* | 12/2014 | Saily | ................ | H04W 48/16 455/436 |

OTHER PUBLICATIONS

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", Mar. 2010, 104 pages.

3GPP TS 36.331 V9.9.0, "3rd Generation Partnership Project; Technical Specification Group Radio Access Network; Evolved Universal Terrestrial Radio Access (E-UTRA); Radio Resource Control (RRC); Protocol specification (Release 9)", Dec. 2011, 253 pages.

3GPP TS 36.304 V9.9.0, "3rd Generation Partnership Project; Technical Specification Group Radio Access Network; Evolved Universal Terrestrial Radio Access (E-UTRA); User Equipment (UE) procedures in idle mode (Release 9)", Dec. 2011, 32 pages.

Institute for Information Industry (III) et al., 3GPP TSG RAN WG3 Meeting #74, R3-112962, "Handover Procedures for Mobile RN", San Francisco/USA, Nov. 14-18, 2011, XP050566244, 4 pages.

ETSI TS 136 304 V10.4.0, "Evolved Universal Terrestrial Radio Access (E-UTRA), User Equipment (UE) procedures in idle mode (3GPP TS 36.304 version 10.4.0 Release 10)", Jan. 1, 2012, XP014069606, 35 pages.

3GPP TR 36.806 V2.0.0, "3rd Generation Partnership Project; Technical Specification Group Radio Access Network; Evolved Universal Terrestrial Radio Access (E-UTRA); Relay architectures for E-UTRA (LTE-Advanced) (Release 9)", Feb. 2010, XP050450793, 34 pages.

Office Action for European Patent Application 12741304.5, dated Nov. 15, 2016, 6 pages.

* cited by examiner

SIGNALING A NEW INFORMATION ELEMENT FOR THE MOBILITY STATE ESTIMATE OF MOVING RELAY USER EQUIPMENTS

This application is a national stage entry of PCT Application No. PCT/EP2012/064471, filed on Jul. 24, 2012, entitled "SIGNALING A NEW INFORMATION ELEMENT FOR THE MOBILITY STATE ESTIMATE OF MOVING RELAY USER EQUIPMENTS", which is hereby incorporated by reference in its entirety.

FIELD OF THE INVENTION

The present invention relates to apparatuses, methods and a computer program product for signaling a new Information Element for the Mobility State Estimate of Moving Relay User Equipments.

RELATED BACKGROUND ART

The following descriptions for the abbreviations used in this specification apply:
Alt Alternative
DeNB Donor eNB
eNB enhanced Node B
E-UTRA Evolved Universal Terrestrial Radio Access
GW Gateway
HO Handover
IE Information Element
LTE Long Term Evolution
LTE-A LTE-Advanced
MBSFN Multi-Media Broadcast over a Single Frequency Network
MME Mobility Management Entity
MSE Mobility State Estimate
PGW Packet Data Network Gateway
RAT Radio Access Technology
Rel. Release
RLF Radio Link Failure
RN Relay Node
RRC Radio Resource Control
RSRP Reference Signal Received Power
SF Scaling Factor
SGW Serving Gateway
TTT Time-To-Trigger
Tx Transmission
UE User equipment Embodiments of the present invention relate to LTE-Advanced, and in particular to relaying.

Relaying is considered for LTE-Advanced as a tool to improve, e.g. the coverage of high data rates, group mobility, temporary network deployment, the cell-edge throughput and/or to provide coverage in new areas. Relay as an important topic for Release (Rel.) 10 has been discussed in 3GPP. In a relay system, a relay node (RN) acts as UE from donor eNB (DeNB) point of view, while it behaves as an eNB for the UEs served by the RN. Therefore, the RN supports eNB functionality as well as UE functionality.

FIG. 2 shows a relay system architecture. It is noted that Alt1 to Alt3 show different alternatives of which elements are to be considered as part of the relay system. For example, Alt2 was selected by 3GPP for fixed relay implementation in Release 10.

Hitherto, only fixed relay for coverage extension scenario was discussed extensively in Rel.10. However, moving relays (relay nodes (RNs)), also referred to as mobile relays, are also of great interest, for example in high speed train infrastructure. Therefore, moving relay nodes, as an important candidate feature, are investigated in Rel. 11. In addition to the application area for the high speed trains, moving relay nodes can be also mounted on busses, trams, ferries, and any other kind of vehicles depending on the target service. An example high speed train scenario is illustrated in FIG. 3 where two moving RNs are mounted on train carriages. In this example, there is one moving relay mounted on each carriage. It is worth noting that the access link antennas of the moving relay node are installed inside the carriage and the backhaul link antennas are installed outside the carriage. Such a configuration prevents penetration loss.

Furthermore, there are three types of RNs standardized in LTE-Advanced Release 10. The functionalities defined for the fixed relays can also apply to moving relays. These types are briefly described in the following:

Type 1: This is an inband RN. Hence, to prevent self interference between backhaul and access links, a half-duplex operation is employed. During the backhaul subframes, the RN configures Multi-Media Broadcast over a Single Frequency Network (MBSFN) subframes on the access link in the downlink. The beginning of an MBSFN subframe contains cell-specific reference signals. Release 8 UEs receive these signals and ignore the rest of the MBSFN subframe.

Type 1a: This is an outband RN. That is, on backhaul and access links different frequency bands are utilized. As there is no self interference, there is no need for MBSFN subframes on the access link. All the subframes in an LTE frame are utilized both on the access and backhaul links.

Type 1b: This is an inband RN with sufficient isolation between backhaul and access links. Thanks to this sufficient isolation, all the subframes in an LTE frame can be utilized and there is no need for MBSFN subframes. Considering the penetration loss between inside and outside the carriage, a sufficient isolation is assumed in the moving relay scenario and hence Type 1b is viable.

In the moving relay scenario, there might occur problems when performing a handover of a user equipment (relay-UE) from a moving relay node to fixed eNB or other fixed base station.

SUMMARY OF THE INVENTION

Embodiments of the present invention address this situation and aim to provide a reliable connection even in case of a handover from a moving relay node to a fixed base station.

According to a first aspect of the present invention an apparatus is provided which comprises a first connection unit configured to provide connection to a user equipment, and a processor configured to detect whether a handover of the user equipment is required, and, if a handover is required, to establish mobility information regarding the mobility state of the apparatus as mobility information of the user equipment, and to send the mobility information to at least one network element involved in the handover of the user equipment.

According to a second aspect of the present invention an apparatus is provided which comprises a connection unit, and a processor configured to receive, via the connection unit, mobility information regarding a mobility state of a user equipment, which is to perform a handover from a network control element to the apparatus, and to use the received mobility information for preparing the handover of the user equipment.

According to a third aspect of the present invention an apparatus is provided which comprises a connection unit, and a processor configured to receive, via the connection unit, mobility information regarding a mobility state from a first network control element, and to replace a mobility state of the apparatus by the mobility state received in the mobility information upon preparing a handover from the first network control element to a second network control element.

According to a fourth aspect of the present invention a method is provided which comprises
  providing a connection to a user equipment,
  detecting whether a handover of a user equipment is required,
  and, if a handover is required,
  establishing mobility information regarding the mobility state of the apparatus as mobility information of the user equipment, and
    sending the mobility information to at least one network element involved in the handover of the user equipment.

According to a fifth aspect of the present invention a method is provided which comprises
  receiving mobility information regarding a mobility state of a user equipment, which is to perform a handover from a network control element to an apparatus carrying out the method, and
  using the received mobility information for preparing the handover of the user equipment.

According to a sixth aspect of the present invention a method is provided which comprises
  receiving mobility information regarding a mobility state from a first network control element, and
  replacing a mobility state of the apparatus carrying out the method by the mobility state received in the mobility information upon preparing a handover from the first network control element to a second network control element.

According to a seventh aspect of the present invention, a computer program product is provided which comprises code means for performing a method as set out in the above fourth to sixth aspects and modifications thereof when run on a processing means or module.

Hence, according to aspects of the present invention, a mobility state of user equipment, which is about to perform a handover from a moving relay node to a fixed base station, is indicated based on the mobility state of the moving relay node. Hence, a handover from the moving relay node to the fixed base station can reliably be performed.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

A general embodiment is described in the following by referring to FIG. 1, in which some examples for apparatuses according to embodiments are shown.

Figure 1:
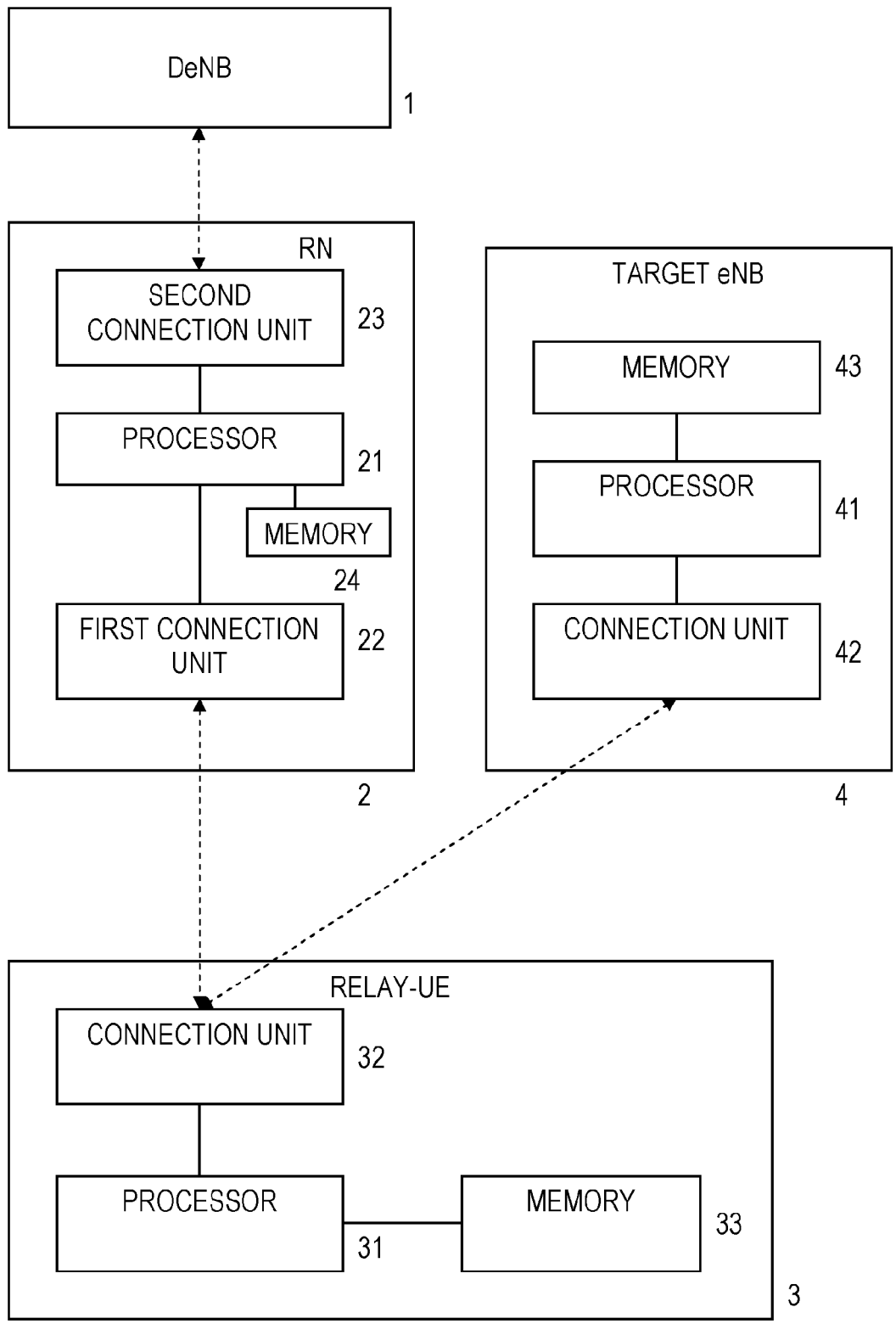
FIG. 1 shows basis structures for a DeNB, an RN, a relay-UE and a target eNB according to general embodiments of the present invention.
Figure 2:
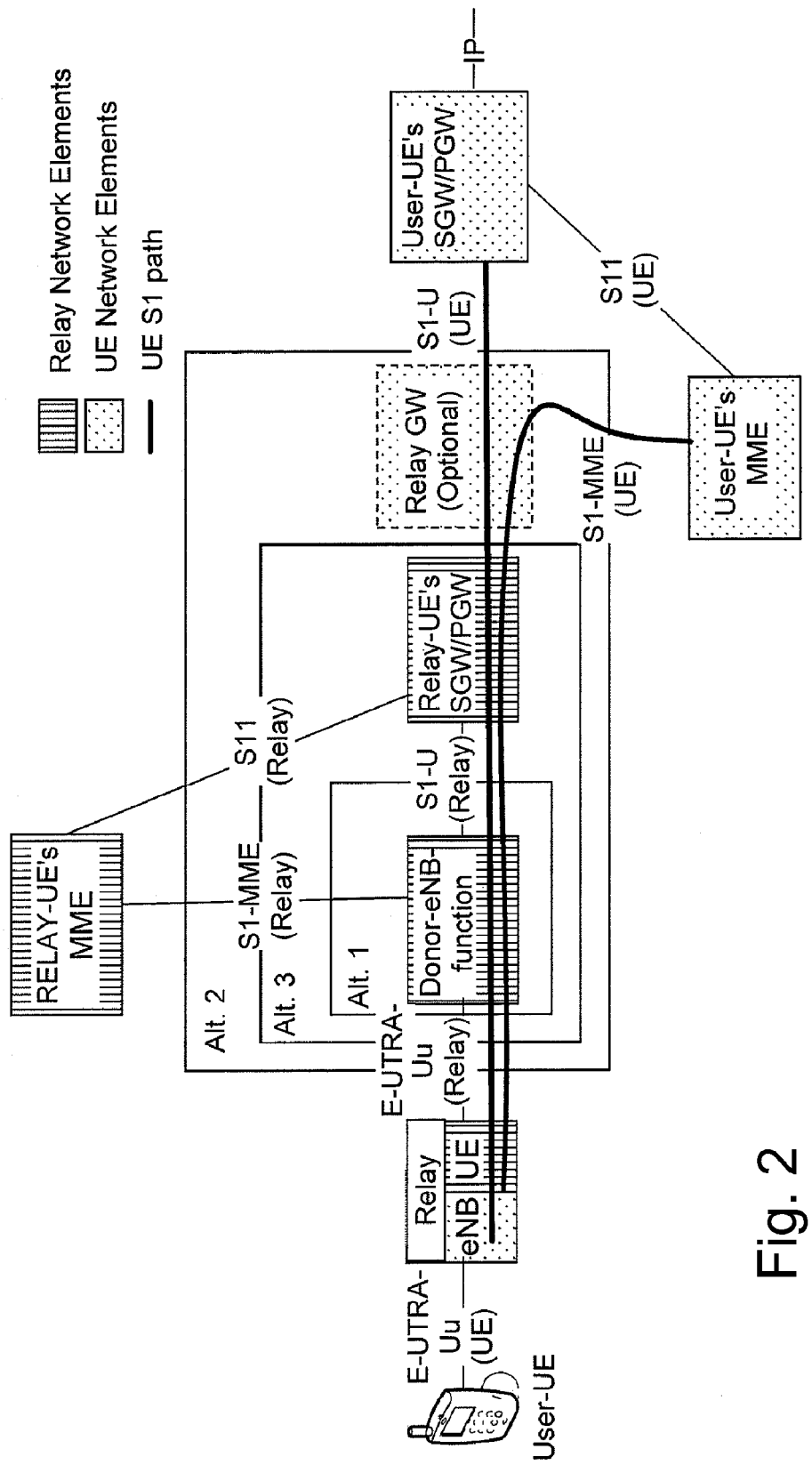
FIG. 2 shows a general relay system architecture.

FIG. 1 shows a relay node (RN) 2 as an example for an apparatus (which may be a relay node but also only a part thereof) according to a general embodiment of the present invention. The RN 2 comprises a first connection unit 22 configured to provide connection to a user equipment, and a processor 21. The processor 21 is configured to detect whether a handover of the user equipment (e.g., UE 3 shown in FIG. 1) is required, and, if a handover is required, to establish mobility information regarding the mobility state of the apparatus as mobility information of the user equipment, and to send the mobility information to at least one network element involved in the handover of the user equipment.

The RN 2 may also comprise a memory 24 for storing data and programs, by means of which the processor 21 may carry out its corresponding functions. Furthermore, the RN 2 may comprise a second connection unit 23 for providing a connection to a network control element such as a donor eNB (DeNB) 1.

Hence, according to general embodiments of the present invention, mobility information of a relay node currently serving a user equipment is provided to a network element which is involved in handover of the user equipment.

This network element may be a base station of a target network, for example, so that this base station can apply the mobility state of the relay node to the user equipment. Alternatively (or in addition), the network element may be the user equipment itself. In this way, the user equipment can itself configure with the mobility state of the relay node.

Hence, according to the general embodiments, it is assured that a handover of a user equipment from a moving relay node to a (fixed) base station can be successfully carried out.

An example for a base station of a target cell is a target eNB 4 shown in FIG. 1. The target eNB 4, which is an example for a corresponding apparatus, comprises a connection unit 42 and a processor 41. The processor 41 is configured to receive, via the connection unit, mobility information regarding a mobility state of a user equipment, which is to perform a handover from a network control element to the apparatus, and to use the received mobility information for preparing the handover of the user equipment.

The target eNB 4 may also comprise a memory 43 for storing data and programs, by means of which the processor 41 may carry out its corresponding functions.

An example for a user equipment (UE) described above is a UE 3 shown in FIG. 1. The UE 3, which is an example for a corresponding apparatus, comprises a connection unit 32 and a processor 32. The processor 32 is configured to receive, via the connection unit, mobility information regarding a mobility state from a relay node, and to replace a mobility state of the apparatus by the mobility state received in the mobility information upon preparing a handover from the first network control element to a second network control element.

The first network control element may be the relay node 2 shown in FIG. 1, and the second network control element may be the target eNB 4 shown in FIG. 1, for example. Moreover, the UE 3 may also comprise a memory 33 for storing data and programs, by means of which the processor 31 may carry out its corresponding functions.

It is noted that in the present description, the DeNB is an example for a network control node capable of serving a relay node, and the eNB is an example for a network control node not capable of serving a relay node. Furthermore, a user equipment served by a relay node (RN) is also referred to as relay-UE.

In the following, detailed considerations for the solution according to the embodiments are described in some more detail.

Figure 3:
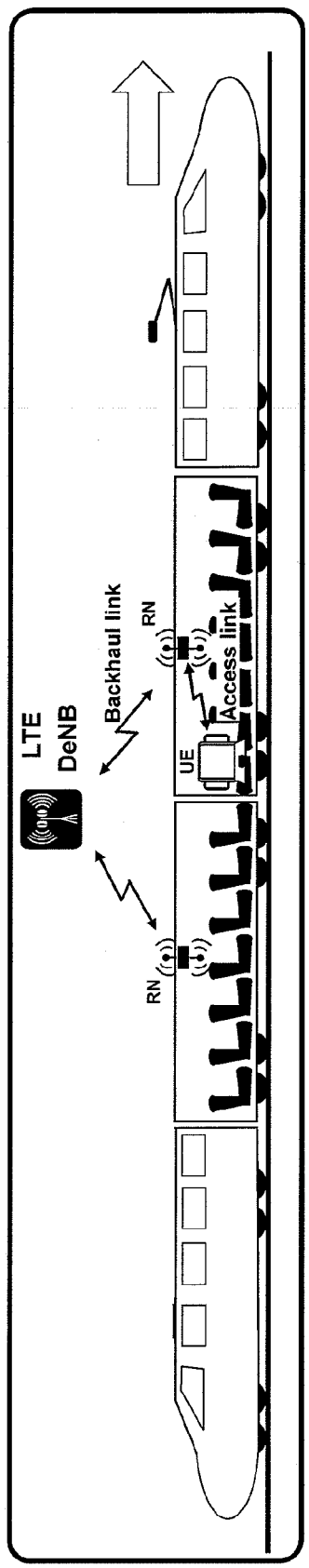
FIG. 3 shows a moving relay illustration for a high speed train scenario.

First, a main or common issue which might occur in the moving relay scenario (as described above in connection with FIG. 3) is described, following by some scenarios as use cases.

Main Issue:

Mobility related parameters (time to trigger, filter coefficients) of UEs are configured based on a mobility state estimate (MSE) of the UE. The MSE of the UE is determined autonomously by the UE according to the number of cell reselections/handovers during a certain time interval in idle and active mode, respectively.

In case of a moving relay node, the relay-UEs are mostly connected to the moving relay and thus they are considered to be slow with respect to the moving relay (MSE: stationary), whereas they are fast with respect to the macrocells outside. If the moving-RN needs to hand over its relay-UEs, due to any reasons that are exemplified in the following, the mobility parameters of these relay-UEs conveyed by the serving moving relay to the target cell will be wrong. Namely, these relay-UEs will be considered as slow by the target cell although they are fast with respect to this target cell.

That is, after the handover, there is an abrupt change in the actual MSE of the relay-UE (slow to fast). However, for the relay-UE and the target cell the MSE of the relay-UE still remains stationary. Consequently, e.g., configuring the relay-UE with a large time to trigger and filter coefficient corresponding to a stationary UE is critical as the relay-UEs will be more susceptible to experience radio link failures directly after the handover and much before they adapt to their "correct" fast MSEs.

Figure 4:
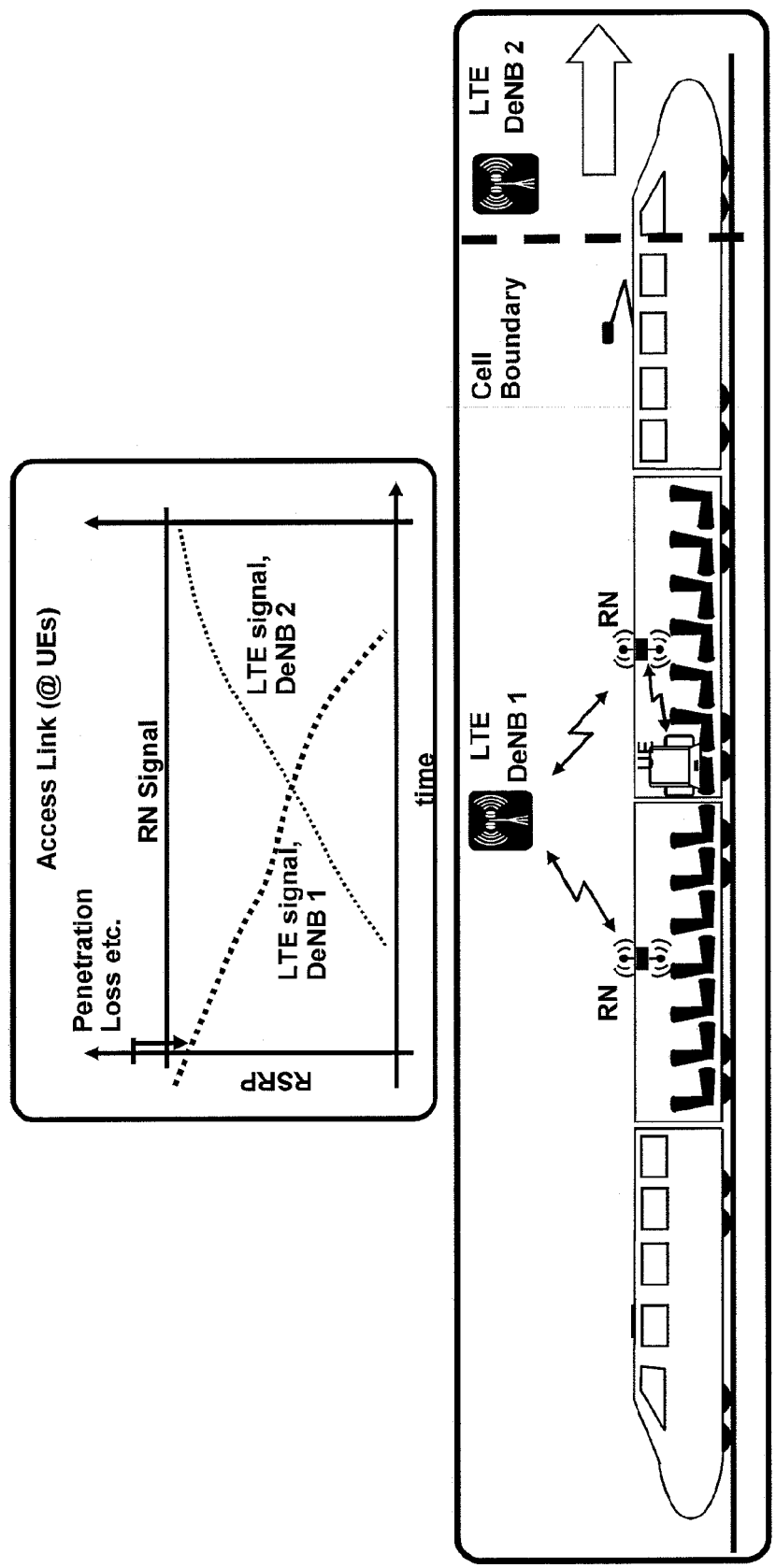
FIG. 4 illustrates a scenario where a backhaul HO failure/rejection or partial admittance may take place.

The key point here is that the relay-UEs receive a very high signal level from the moving relay on the access link. Thus, unless there is a backhaul link problem or an intended/deliberate handover (see in Scenario 1 and Scenario 3 described in the following) these relay-UEs remain connected to the moving relay. In FIG. 4, a scenario is depicted where the train is moving away from a DeNB 1 cell towards a DeNB 2 cell. As it can be seen in FIG. 4, the access link received power on the downlink is significantly higher than the signal powers received from DeNB 1 and DeNB 2. Note that the RNs have typically a transmission (Tx) power of 30 dBm and the DeNBs have a transmission power of 46 dBm [TS 36.814 ("Further Advancements for E-UTRA, Physical Layer Aspects, (Release 9)," 3GPP, v. 9.0.0, March 2010)]. Yet, on the access link there is no penetration loss (which is around 20 dB or higher depending on the transportation vehicle) but the signals from DeNBs/outside cells undergo penetration loss and they are farther away compared to the moving RNs.

In the following, some scenarios are described where the moving relay needs to handover all of its relay-UEs or a fraction of them.

Scenario 1: Backhaul HO Failure/Rejection (Target Macrocell: Intra-RAT or Inter-Frequency DeNB)

In this scenario, the vehicle is moving away from a serving DeNB 1 cell to another target DeNB 2 cell. An example scenario is demonstrated in FIG. 4 considering high speed train as the vehicle. For a seamless service the moving relay should be handed over to the target DeNB 2 cell. However, for some reasons the handover (HO) of the moving relay may fail or be rejected. Note here that any unsuccessful HO case is considered under this title. For instance, as an example of HO rejection, if the target cell is over-loaded it may not admit the moving relay since the moving relay is basically serving a multiple of RN-served UEs (relay-UEs) and thus the target cell cannot admit that many UEs. On the other hand, the target DeNB 2 cell could admit a fraction of the relay-UEs and the rest of the relay-UEs could be served by overlaying 2G/3G cells or any other access node which does not support backhauling.

Scenario 2: Backhaul HO is not Possible (Target Macrocell: Intra-RAT eNB, Inter-Frequency eNB, or Inter-RAT 2G/3G)

In this scenario, the vehicle is moving away from a serving DeNB 1 cell to another eNB 2 or 2G/3G or inter-frequency eNB cell. Note here that the next cell is not a DeNB and thus is not capable of serving a moving RN. This scenario can be illustrated similarly as in FIG. 4 via replacing 'LTE DeNB 2' by either eNB 2 or 2G/3G or inter-frequency eNB cell. This issue is outlined as follows:

1. The moving relay is served by an LTE DeNB 1 cell and detects that the target cell does not support relaying functionalities, e.g., Rel. 8 eNB or any others.

2. The relay-UEs have to be handed over before they experience radio link failure (RLF) due to a backhaul link RLF.

It is noted that in SCENARIO 1, the moving RN either hands over all of its relay-UEs (e.g. in case of RLF) or a fraction of them (e.g. in case of overloaded DeNB2 which can accept a fraction of the whole moving relay capacity). On the other hand, in SCENARIO 2, the moving relay needs to hand over all of its relay-UEs.

Moreover, in these scenarios the moving relay serves many UEs (e.g. all the UEs in a carriage of a high speed train) and if the COMMON ISSUE mentioned above is not mitigated, this will become a major issue which could lead RLFs when these relay-UEs are connected to the target cell.

Scenario 3: Load Balancing in Case of Carrier Aggregation

In case the moving relay is overloaded and supports e.g. a single frequency band on the access link, a fraction of the relay-UEs that support multiple bands can be handed over to other target cells supporting these frequency band(s).

It is noted that in all above three scenarios, the relay-UEs should be handed over to the target cell early enough so that the handovers will be successful.

In the following, before discussing two solutions for the aforementioned main issue, a preliminary solution is described.

Preliminary Solution:

The preliminary solution is that the moving relay or the serving DeNB modifies the mobility parameters (such as Time to Trigger, Filter Coefficients) of the relay-UEs according to the state of the moving relay when they are handed over to other target cells other than moving relays. This approach does not resolve the problem as the target cell can again change the mobility related parameters of the relay-UE using the History Information Element (IE). The detailed description is as follows.

First, within the framework of LTE the mobility related context, which is exchanged during handover (HO), is considered [TS 36.331 ("Evolved Universal Terrestrial Radio Access (E-UTRA); Radio Resource Control (RRC); Protocol specification," 3GPP)].:

The only speed related UE context that is exchanged during the HO can be found in the RRC specific part of the S1AP: HANDOVER REQUIRED/REQUEST message(s) or X2AP HANDOVER REQUEST message from source to target node. The RRC specific part consists of a handover-PreparationInformation IE where, following the structure of this IE→as-Config→sourceMeasConfig→speedStatePars-→setup contains two speed related IEs:

mobilityStateParameters timeToTrigger-SF

The concept behind these parameters is that the network enables the UE to detect its mobility state autonomously. For example, mobilityStateParameters provides time windows (e.g., 30 s, 60 s, 120 s, 180 s, 240 s) and event thresholds (e.g., 1, 2, ..., 16) telling the UE when it has to change to from normal to medium and from medium to high mobility state [TS 36.304 ("Evolved Universal Terrestrial Radio Access (E-UTRA); User Equipment (UE) procedures in idle mode," 3GPP)]. The event is the count of handovers per time window in the active mode and the number of reselections in the idle mode. The other parameter, timeToTrigger-SF provides speed scale factors, e.g. 1.0, and 0.25 which have to be used in normal and high mobility states, respectively. The speed scale factor which is valid for the mobility state is multiplied with the mobility parameter 'time to trigger' (TTT) which is used to determine the trigger conditions for measurement reports that may be used to initiate the handover. Effectively, this allows for applying a shorter TTT value for UEs moving at medium speed and even a shorter value for UEs moving at high speed.

The important thing is that the network cannot directly set the mobility state in the UE, only the conditions can be set how the UE determines its mobility state (because the mobility state is calculated based on the number of handovers/cell reselections per time window). Till Release 11, the network is not informed about the mobility state of the UE. However, there is a History IE which is transferred from source to target. This History IE is tracing back how long the UE stayed in what cells and how big these cells have been {verysmall, small, medium, large, ... }. Knowing the speedStatePars that were used in the source cell (or the target cell if they were replaced during handover by the target), the target cell can estimate the UE's mobility state. But this network based method will also fail to solve the problem because it can only count the number of handovers per time, but the relay-UE didn't perform HOs (MSE: stationary) as long as it was served by the moving relay node.

It can be concluded that the existing mobility related information and thus their modification by the moving relay or the serving DeNB during a HO to target cells outside the train cannot solve the problem.

Accordingly, according to embodiments of the present invention, the following two solutions are proposed to resolve this problem.

Solution 1 (Network Based and Thus Backwards Compatible Solution):

To ensure that the target cell does not configure the relay-UE with mobility parameters corresponding to a stationary UE (based on the wrong History IE), the moving relay should signal to the target cell a new IE in the Handover Request message. This new IE contains the actual correct mobility state of the relay-UE (i.e. MSE: fast), which can be set, e.g., to the state of the moving relay. By using this new IE, the target cell now configures the relay-UE with mobility parameters corresponding to a fast UE.

As an amendment to above solution, the moving relay can adjust the mobility parameters of the relay-UE during the handover (i.e. the preliminary solution given above). So, the target cell can make use of them.

It is noted that, if the target cell is a neighbor moving relay, such an IE is not signaled (it is not necessary).

Moreover, it is noted that in this solution, the state of the relay-UE is still slow. Therefore, the target-cell should further scale down the mobility parameters. An example implementation is given in the next section.

Moreover, preferably, the priority of the new IE should be higher than that of the History IE. That is, the target cell should prioritize the new IE.

In the following, an example implementation for the SOLUTION 1 (Network based and thus Backwards Compatible Solution) is described:

In the example scenario, within the framework of [TS 36.304 ("Evolved Universal Terrestrial Radio Access (E-UTRA); User Equipment (UE) procedures in idle mode," 3GPP)], the relay-UE is stationary relative to the moving relay (e.g. scaling factor (SF)_normal=1.00, i.e. slow) and fast relative to the target cell (e.g. SF_high=0.25). Further, the SF of the moving relay is assumed to be SF_RN=SF_high=0.25, i.e. fast. In the new IE SF_RN=SF_high is signaled to the target cell. The time-to-trigger (TTT) calculated by the relay-UE is The relay-UE is connected to the moving relay→
 TTT_relayUE=SF_normal*TTT_of_RNcell;

The relay-UE is connected to the target cell after the handover:
 Without correction→TTT_relayUE=SF_normal*TTT_of_targetCell
 After correction→TTT_relayUE=SF_normal*(Correction Factor*TTT_of_targetCell) where Correction Factor=SF_high/SF_normal Solution 2 (UE Based and Thus can be Supported by UEs Beyond Release 10):

In this solution the moving relay broadcasts/signals to the idle/connected relay-UE the mobility state of the moving relay (e.g. normal/medium/high). Then, the relay-UE replaces its own current mobility state by the mobility state of the moving relay. Such signaling can be initiated for the active relay-UEs when the relay-UEs are handed over to the target cell.

In addition to that, the target cell should still be informed about the new mobility state of the relay-UE so that the correct mobility parameters can be applied.

It is noted that according to this solution, the mobility state of relay-UE will not be changed, if the target cell is a neighbor moving relay. That is, in such a case, the solution would not be necessary.

Compared to SOLUTION 1 above, the mobility state of the relay-UE has changed to the correct one in this solution. Therefore, the target cell does not need to further scale down the mobility parameters.

Moreover, similar as described above, preferably the priority of the new IE should be higher than that of the History IE. That is, the target cell should prioritize the new IE.

Thus, according to some embodiments of the present invention as described above, a new Information Element (IE) for the Mobility State Estimate (MSE) of moving relay user equipments (UEs) is sent contained in the UE_context, when the UEs are handed over to a target cell.

It is noted that the embodiments and the present invention in general is not limited to the specific examples given above.

For example, in the embodiments described above, a moving relay node is described, from which a handover to a fixed base station is to be performed. However, the moving relay node is only an example, and the invention can be applied to any case in which one of the base stations (or similar apparatuses) involved in a handover of a user equipment is moving relatively to the other.

Moreover, the embodiments described above were described with respect to the application area for the high speed trains. However, the invention is not limited to this specific application; moving relays can be also mounted on busses, trams, ferries, and any other kind of vehicles or moving objects depending on the target service. In such scenarios, the handovers of the relay-UEs are expected to be more frequent.

According to a further aspect of embodiments of the present invention, an apparatus is provided which comprises
  means for providing a connection to a user equipment,
  means for detecting whether a handover of the user equipment is required, and
  means for, if a handover is required, establishing mobility information regarding the mobility state of the apparatus as mobility information of the user equipment, and for sending the mobility information to at least one network element involved in the handover of the user equipment.

According to another aspect of embodiments of the present invention, an apparatus is provided which comprises
  means for receiving mobility information regarding a mobility state of a user equipment, which is to perform a handover from a network control element to the apparatus, and
  means for using the received mobility information for preparing the handover of the user equipment.

According to a still further aspect of embodiments of the present invention, an apparatus is provided which comprises
  means for receiving mobility information regarding a mobility state from a first network control element, and
  means for replacing a mobility state of the apparatus by the mobility state received in the mobility information upon preparing a handover from the first network control element to a second network control element.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
  usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
  a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
  devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus provided at a mobile relay node, the apparatus comprising:
a processor configured to:
detect whether a handover of a user equipment from the mobile relay node to a target cell is required,
if the handover is required, set an actual mobility state of the user equipment to a mobility state of the mobile relay node, and
send the actual mobility state of the user equipment, which has been set to the mobility state of the mobile relay node, to a network element of the target cell.

2. The apparatus according to claim 1, wherein:
the processor is configured to send the actual mobility state of the user equipment in a handover request message.

3. The apparatus according to claim 1, wherein:
the processor is configured to detect whether the mobile relay node and the target cell are moving relative to each other, and to send the actual mobility state of the user equipment to the network element if the mobile relay node and the target cell are moving relative to each other.

4. The apparatus according to claim 1, wherein:
the processor is configured to send the actual mobility state of the user equipment during the handover by adjusting one or more mobility parameters of the user equipment.

5. The apparatus according to claim 1, wherein:
the processor is configured to relay communications between the user equipment and the network element.

6. The apparatus according to claim 1, wherein:
the processor is configured to set the actual mobility state of the user equipment when the mobile relay node and the network element are moving relative to each other, and when the mobile relay node and the user equipment are generally stationary relative to each other.

7. The apparatus according to claim 2, wherein:
the processor is configured to send the actual mobility state of the user equipment in a new Information Element (IE) of the handover request message.

8. The apparatus according to claim 7, wherein a priority of the new IE of the handover request message is set higher than a priority of a historical IE of the handover request message.

9. An apparatus provided at a network element of a target cell, the apparatus comprising:
a processor configured to:
receive, in a handover request message from a mobile relay node, an actual mobility state of a user equipment, wherein the user equipment is to perform a handover from the mobile relay node to the network element, and wherein the actual mobility state of the user equipment is set to a mobility state of the mobile relay node, and
use the received actual mobility state of the user equipment, which has been set to the mobility state of the mobile relay node, for preparing the handover of the user equipment.

10. The apparatus according to claim 9, wherein:
the processor is configured to adapt one or more mobility parameters of the user equipment after receiving the actual mobility state of the user equipment.

11. An apparatus provided at a user equipment, the apparatus comprising:
a processor configured to:
receive, from a mobile relay node, an actual mobility state of the mobile relay node,
replace a mobility state of the user equipment with the received actual mobility state of the mobile relay node when preparing a handover of the user equipment from the mobile relay node to a network control element of a target cell; and
send, by the user equipment, the mobility state of the user equipment, which has been replaced with the mobility state of the mobile relay node, to the network control element of the target cell.

12. The apparatus according to claim 11, wherein the mobile relay node and the network control element are moving relative to each other.

13. The apparatus according to claim 11, wherein:
the processor is configured to send the received actual mobility state to the network control element.

14. A method comprising:
providing, by a mobile relay node, a connection between the mobile relay node and a user equipment,
detecting, by the mobile relay node, whether a handover of the user equipment from the mobile relay node to a target cell is required,
if the handover is required, setting, by the mobile relay node, an actual mobility state of the user equipment to a mobility state of the mobile relay node, and
sending the actual mobility state of the user equipment, which has been set to the mobility state of the mobile relay node, to a network element of the target cell.

15. The method according to claim 14, further comprising:
send the actual mobility state of the user equipment in a handover request message.

16. The method according to claim 14, wherein the sending comprises:
detecting that the mobile relay node and the network element of the target cell are moving relative to each other, and
sending the actual mobility state of the user equipment to the target cell based on detecting that the mobile relay node and the network element are moving relative to each other.

17. The method according to claim 14, wherein:
the network element comprises the user equipment.

18. The method according to claim 17, further comprising performing at least one of the following:

storing the received actual mobility state of the user equipment in a variable at the user equipment, and updating the mobility state of the user equipment based on the received actual mobility state of the user equipment.

19. The method according to claim 14, further comprising:

sending the actual mobility state of the user equipment during the handover by adjusting one or more mobility parameters of the user equipment.

20. The method according to claim 14, further comprising:

providing, by the mobile relay node, a connection to the network element, and relaying, by the mobile relay node, communications between the user equipment and the network element.

21. The method according to claim 14, wherein sending the actual mobility state of the user equipment in a handover request message comprises sending the actual mobility state of the user equipment in a new Information Element (IE) of the handover request message.

22. A method comprising:

receiving, by a network element, a handover request message from a mobile relay node, wherein the handover request message including information representing an actual mobility state of a user equipment, wherein the user equipment is to perform a handover from the mobile relay node to the network element, and wherein the actual mobility state of the user equipment is set based on a mobility state of the mobile relay node, and using the received actual mobility state of the user equipment, which has been set to the mobility state of the mobile relay node, for preparing the handover of the user equipment.

23. The method according to claim 22, further comprising:

adapting one or more mobility parameters of the user equipment after receiving the actual mobility state of the user equipment.

24. A method comprising:

receiving, by a user equipment, a mobility state of a mobile relay node from the mobile relay node, and replacing, by the user equipment, an actual mobility state of the user equipment with the received mobility state of the mobile relay node when preparing a handover from the mobile relay node to a network control element, and sending, by the user equipment, the mobility state of the user equipment, which has been replaced with the mobility state of the mobile relay node, to the network control element of the target cell.

25. The method according to claim 24, wherein the mobile relay node and the network control element are moving relative to each other.

26. The method of claim 24, further comprising:

sending, by the user equipment, the actual mobility state of the user equipment to the network control element.

* * * * *

UNITED STATES PATENT AND TRADEMARK OFFICE
CERTIFICATE OF CORRECTION

PATENT NO.      : 9,838,926 B2  
APPLICATION NO. : 14/413171  
DATED           : December 5, 2017  
INVENTOR(S)     : Bulakci et al.

Page 1 of 1

It is certified that error appears in the above-identified patent and that said Letters Patent is hereby corrected as shown below:

On the Title Page

Column 1, Item (75), in "Inventors", Line 1, delete "Omer" and insert -- Ömer --, therefor.

In the Claims

In Column 14, Line 12, Claim 24, delete "node, and" and insert -- node, --, therefor.

In Column 14, Line 26, Claim 26, delete "of" and insert -- according to --, therefor.

Signed and Sealed this  
Third Day of April, 2018

Andrei Iancu  
*Director of the United States Patent and Trademark Office*